Figure 6:
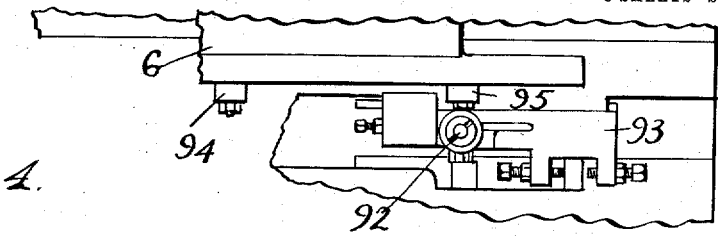

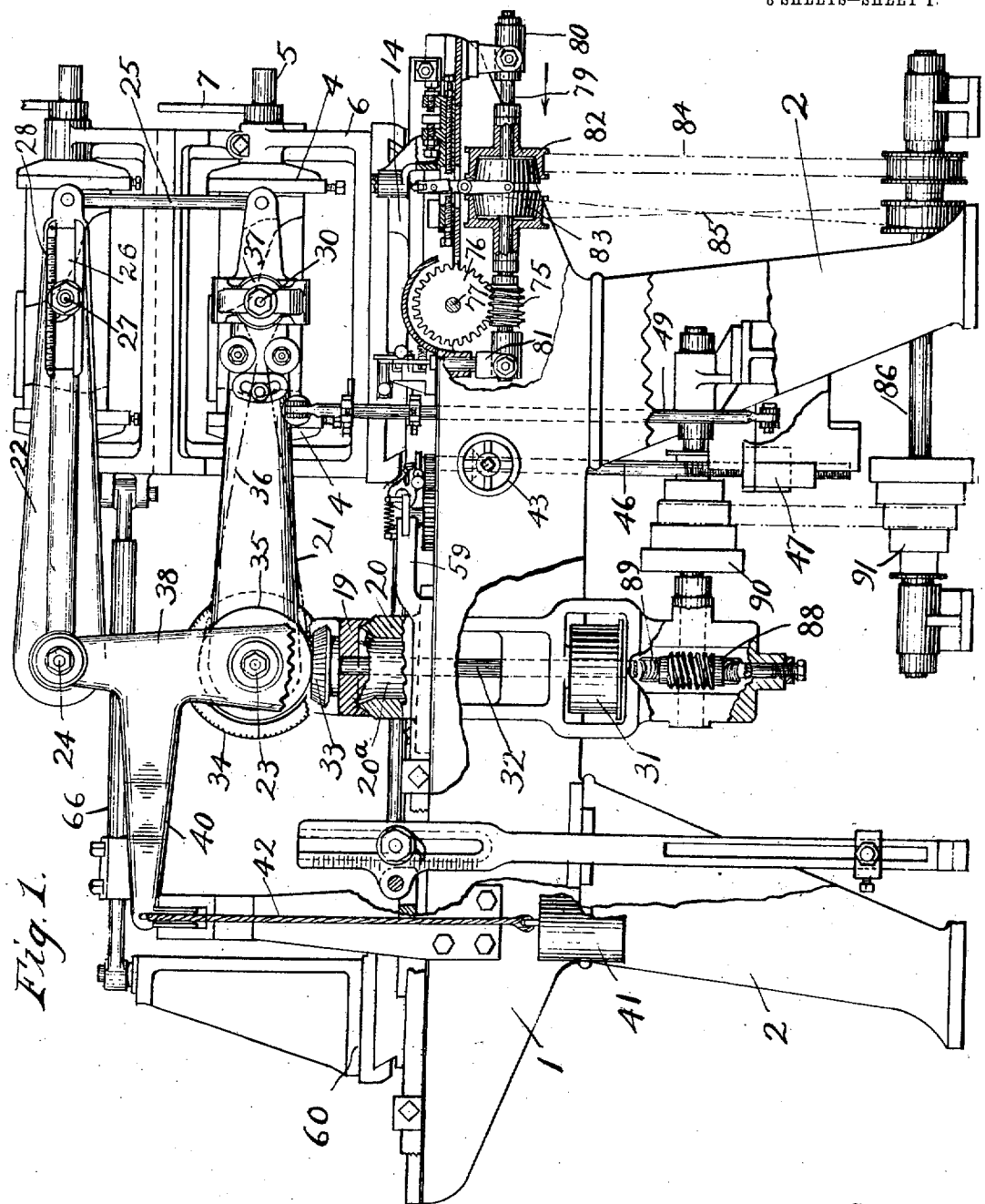

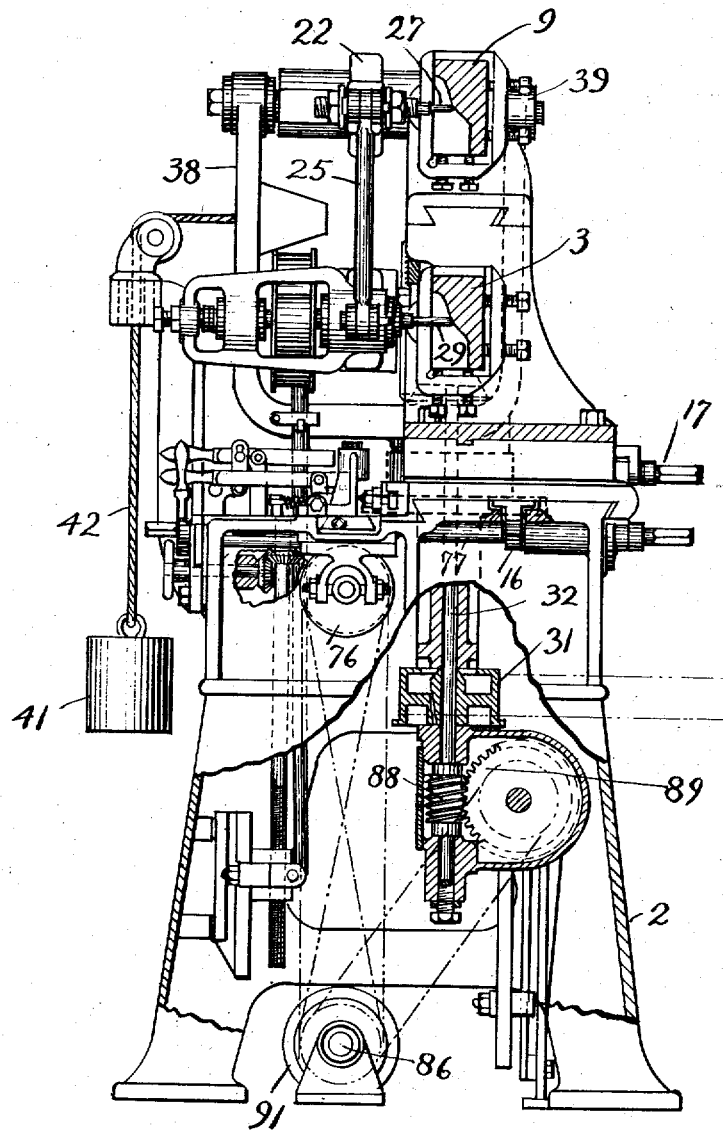

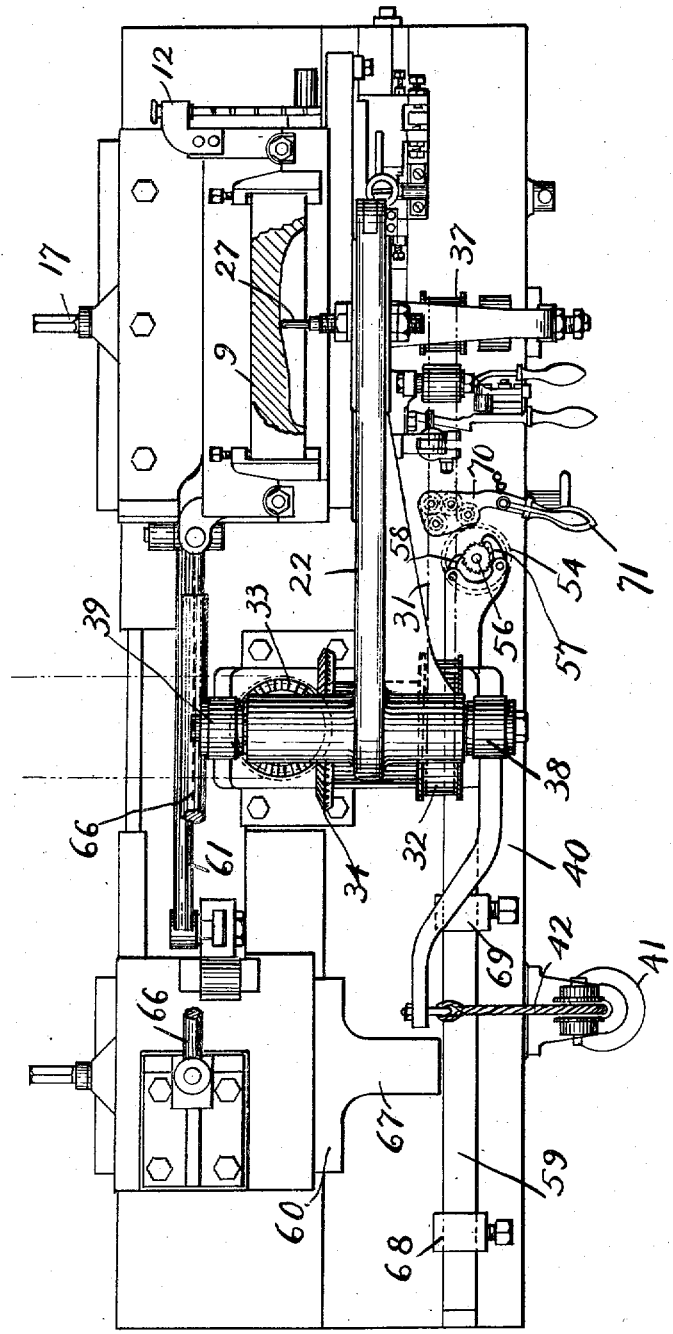

No. 853,501. PATENTED MAY 14, 1907.
H. J. DOUGHTY.
DIE CUTTING MACHINE.
APPLICATION FILED JULY 8, 1905.

8 SHEETS—SHEET 4.

Witnesses
Frank A Foster
E. J. Ogden

Inventor
Henry J. Doughty
By Howard E Barlow
Attorney

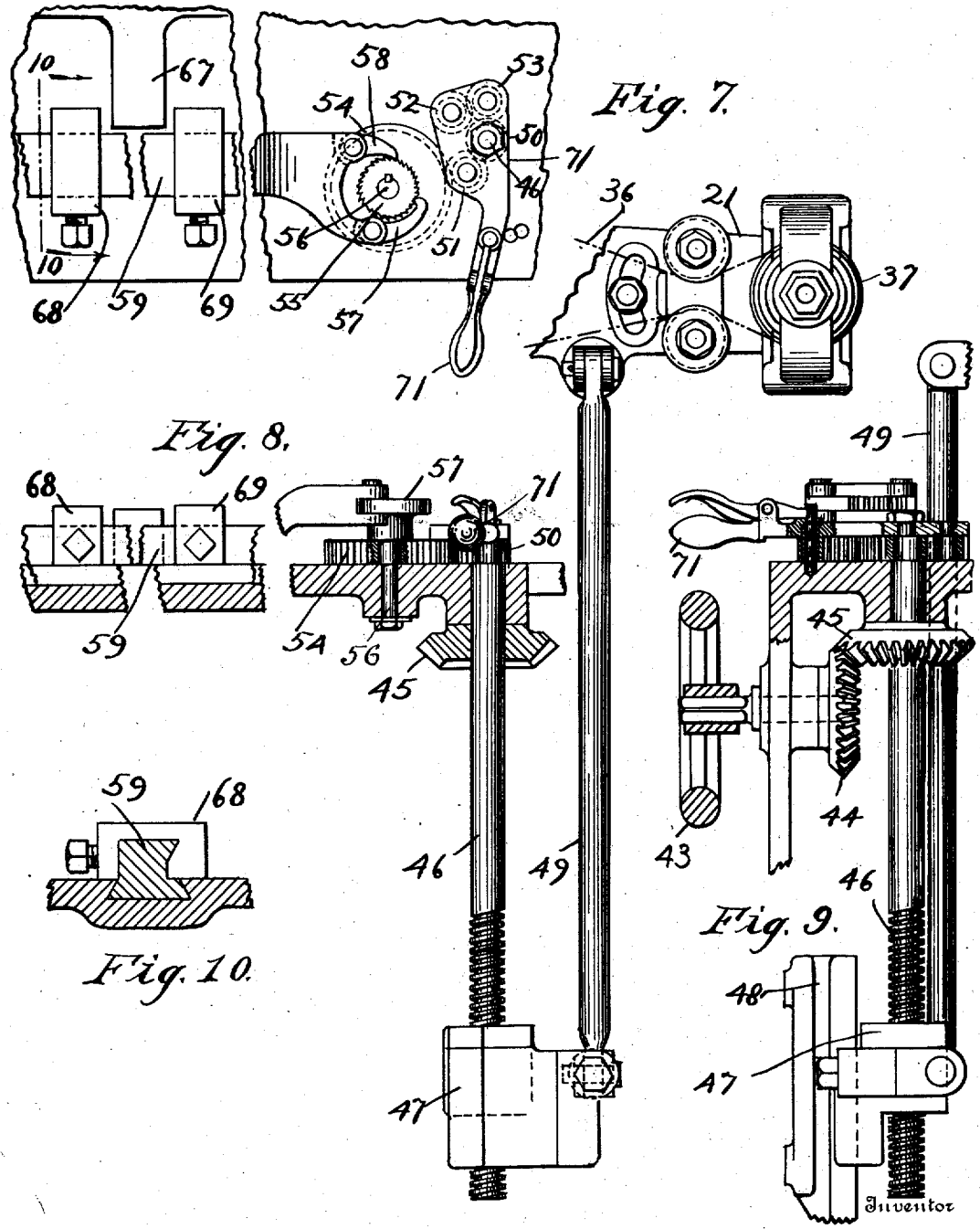

No. 853,501. PATENTED MAY 14, 1907.
H. J. DOUGHTY.
DIE CUTTING MACHINE.
APPLICATION FILED JULY 8, 1905.

8 SHEETS—SHEET 6.

Witnesses
Frank A. Foster
E. J. Ogden

Inventor
Henry J. Doughty
By Howard E. Barlow
Attorney

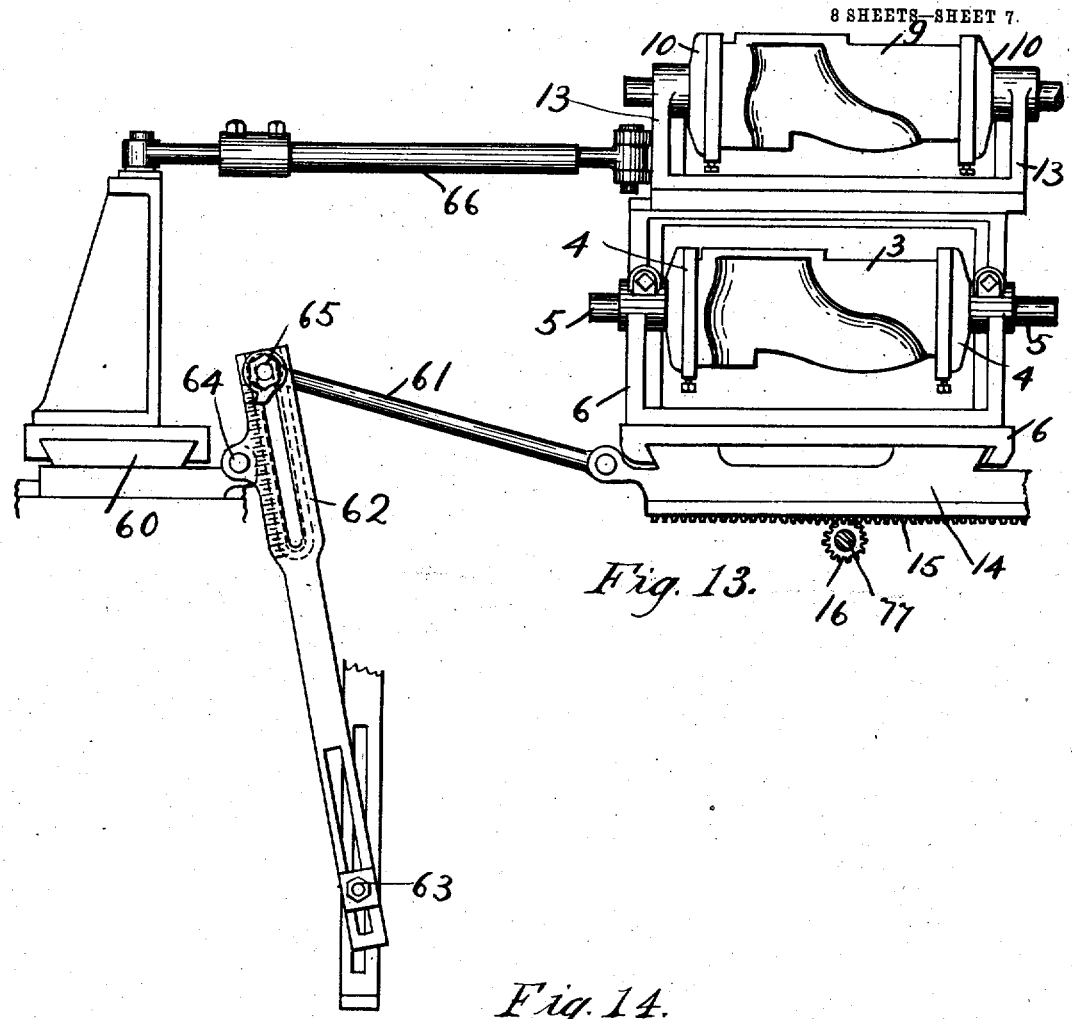

No. 853,501. PATENTED MAY 14, 1907.
H. J. DOUGHTY.
DIE CUTTING MACHINE.
APPLICATION FILED JULY 8, 1905.

8 SHEETS—SHEET 8.

Witnesses
Frank A. Foster
E. O. Ogden

Inventor
Henry J. Doughty
By Howard P. Barlow
Attorney

UNITED STATES PATENT OFFICE.

HENRY J. DOUGHTY, OF PROVIDENCE, RHODE ISLAND, ASSIGNOR TO ATLANTIC RUBBER SHOE COMPANY, OF PROVIDENCE, RHODE ISLAND, A CORPORATION.

DIE-CUTTING MACHINE.

No. 853,501.

Specification of Letters Patent.

Patented May 14, 1907.

Application filed July 8, 1905. Serial No. 268,804.

*To all whom it may concern:*

Be it known that I, HENRY J. DOUGHTY, a citizen of the United States, residing at the city of Providence, in the county of Providence and State of Rhode Island, have invented certain new and useful Improvements in Die-Cutting Machines, of which the following is a specification, reference being had therein to the accompanying drawings.

This invention relates to die cutting machines, and has for its object to provide a machine that will form dies or molds from a model or pattern and grade the same both larger and smaller so that the length of the work may be made in any predetermined ratio to the length of the model or pattern, and the width of the mold may be made in any predetermined ratio to the width of the model or pattern, also that the ratio between the length and the width may be made independent of each other.

In the ordinary die forming machine where the die is cut from a pattern said die is made an exact facsimile of the mold, either larger or smaller, but in direct proportion to the same in all directions, the cutter being controlled to act on the die by the movement of the pointer or tracer over the face of the pattern, both the cutter and tracer being mounted on a single bar.

My improved device is more particularly designed for the grading of molds in which rubber shoes are formed. In these molds the length and the width do not change in direct ratio to each other, therefore the mechanism that operates the endwise movement of the work to form the length of the mold is made and operated independent to that which operates the sidewise movement to form the width.

In practical operation one mold is finished of the middle size to be used as a pattern in the machine, and from that other molds are formed being graduated from the smallest size up to the largest, in sizes or half sizes as may be desired. The machine may be operated so as to graduate the width independent of the length thereby making different widths of the same length from the smallest size up to the size of the model or pattern, and even duplicating the model in both length and width or duplicating the length and varying the width. This gives the important advantage of making more than one width of mold from the same pattern. To accomplish this result the work and pattern are mounted one above the other to be moved longitudinally by the movement of a carriage. Two arms are pivotally mounted at one end and connected together at their opposite ends to be moved up and down simultaneously. In one arm is mounted the cutter and in the other the tracer, and to obtain the grading of the different widths the tracer is adjusted longitudinally either in or out in its arms to make its working length either longer or shorter than the working length of the cutter arm, thereby producing a mold either narrower or wider than the pattern. The adjusting for length is obtained by regulating the longitudinal travel of the carriage on which the work is mounted so that said travel will be either greater or less than that of the pattern.

This invention consists of other novel features and parts and combinations of the same as will be fully described hereinafter and then pointed out in the appended claims.

A practical embodiment of the invention is represented in the accompanying drawings forming a part of this specification, in which similar characters of reference indicate corresponding parts in all the views.

Figure 4:
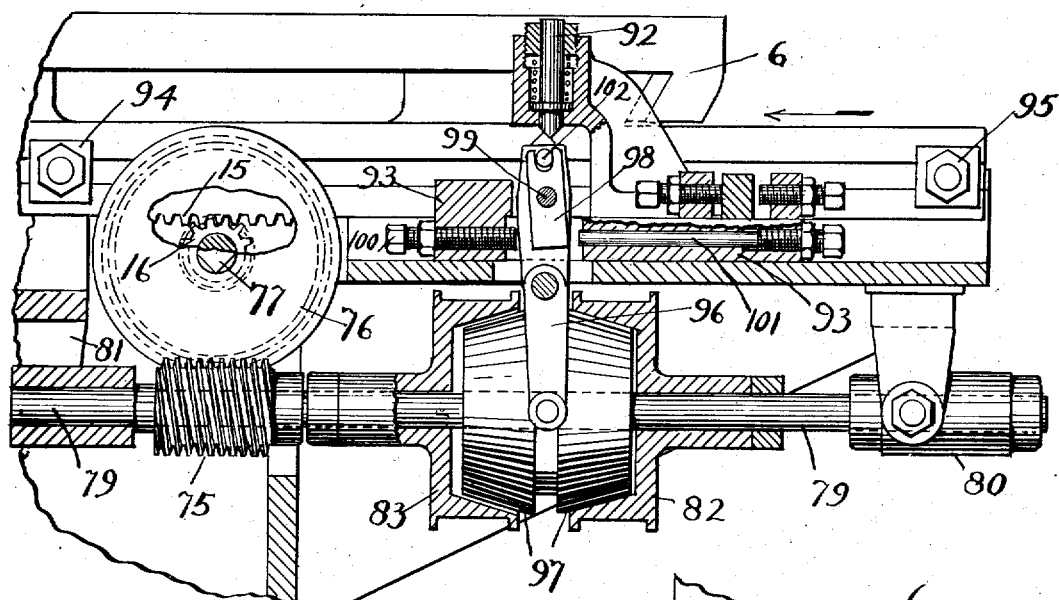
Figure 5:
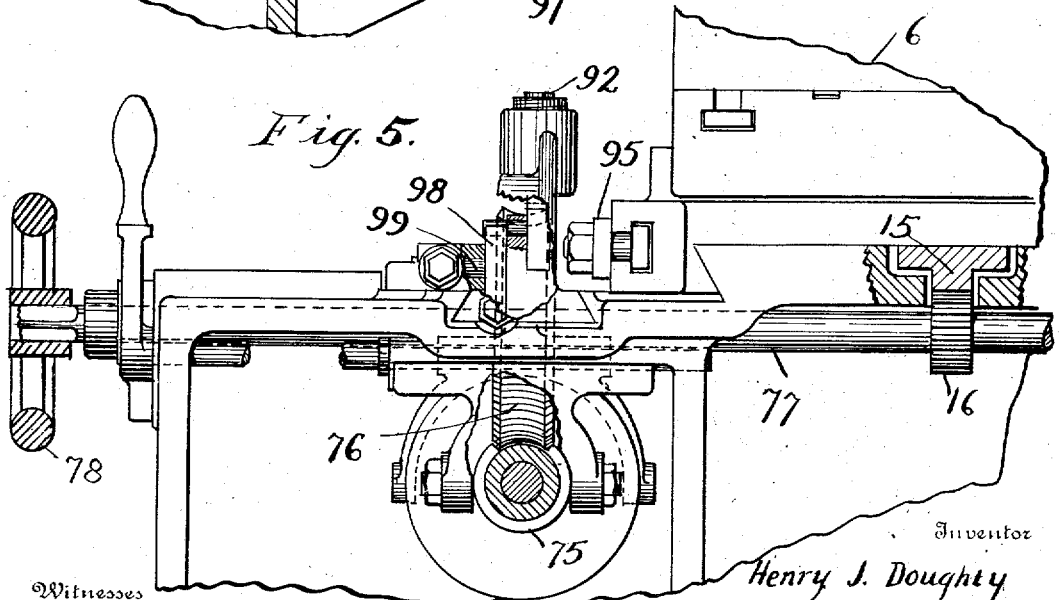
Figure 11:
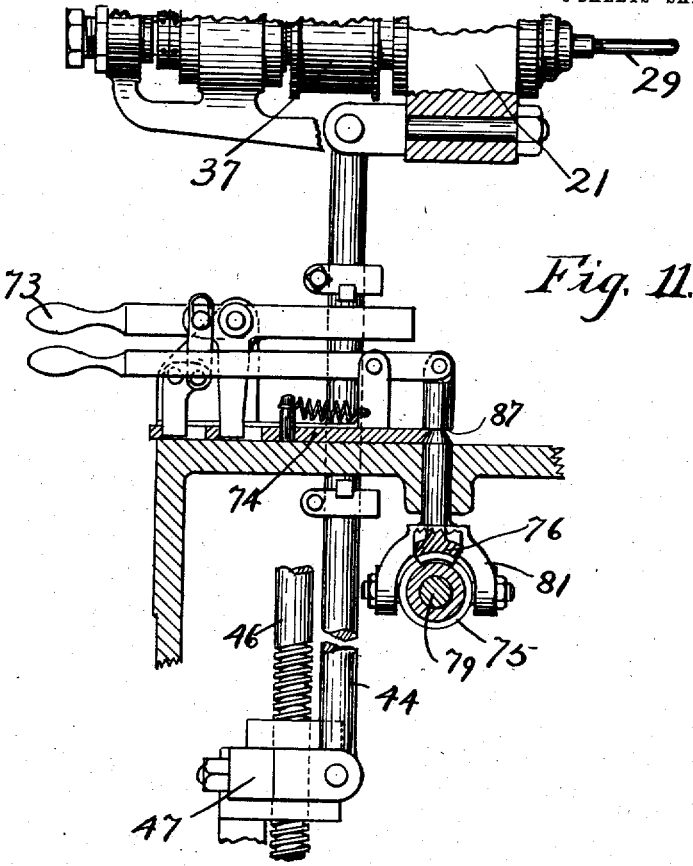
Figure 12:
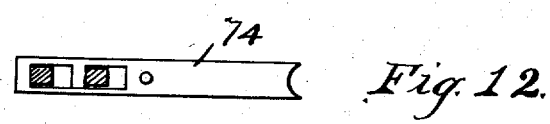
Figure 16:
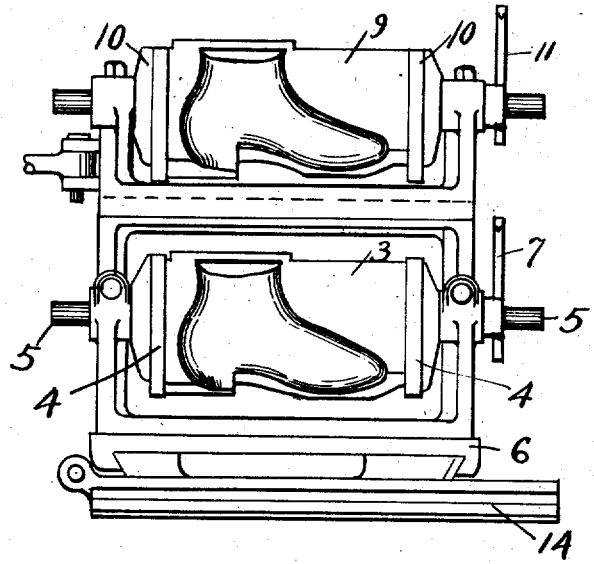
Figure 15:
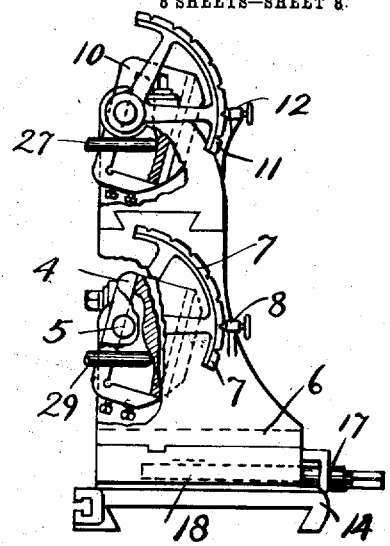

In the drawings: Figure 1—is a side elevation of the machine, partly in section, showing the operating mechanism. Fig. 2—is an end elevation of the machine, partly in section. Fig. 3—is a plan view of the machine showing one of the molds, partly in section. Fig. 4—is an enlarged detail partly in section showing the mechanism which operates the longitudinal feed motion of the carriage. Fig. 5—is an end elevation, partly in section, of the carriage longitudinal feed motion. Fig. 6—is a plan view of the automatic reversing mechanism which operates the longitudinal traverse of the carriage showing the reversing dogs and the stop screws which limit the travel of the reversing slide. Fig. 7—is a plan view showing a portion of the bed with the said actuating mechanism and the feed reversing handle mounted thereon. Fig. 8—is a side elevation, partly in section, showing the feed actuating mechanism and its operating screw and connection to the cutter head. Fig. 9—is an end elevation of a portion of the bed showing the said cutter feed actuating mechanism. Fig. 10—is a section on line 10—10 of Fig. 7 looking in the direction of the arrow, illustrating the manner of attaching the dog to the actuating feed bar. Fig. 11—is a side elevation of a portion of the cutter head and the mechanism whereby the worm may be disengaged from the worm gear to stop the travel of the carriage and the feed of the cutter. Fig. 12—is a top view of the latch which engages the bolt or stem to hold the worm in engagement with the worm gear. Fig. 13—is a detail showing the adjustable means whereby the model and the mold may be made to operate longitudinally and grade for the length of the work. Fig. 14—is a plan view showing the cutter and the tracer and their relation to each other as they would be set when it is desired to produce a mold larger than a pattern. Fig. 15—is an end view showing the quadrants which are attached to the trunnions of the vises of both the pattern and the mold by which the same may be set in any convenient angle to facilitate the machining of the surface, also showing the latches which engage the notches in said quadrant to hold the same in the desired position. Fig. 16—is a front view of the mechanism illustrated in Fig. 15 showing the pattern and work held in their respective chucks and tipped back at an angle.

Referring to the drawings, at 1 is the bed of the machine that is supported on the four legs 2—2. At one end of this bed is mounted both the pattern, and the work-carrying mechanism, one above the other, the mold 3 in process of manufacture being below in the jaws 4—4 (see Fig. 13) which jaws are in turn carried on trunnions 5—5 in the frame 6 and may be rotated to set the mold at any desired angle to the cutter, by means of a notched segment 7 (see Fig. 15). This segment is fixed to one of the trunnions and engaged at its periphery by the spring lock pin 8. The pattern 9, like the work, is rotatably held in the jaw 10—10, and may be locked in any desired position by the lock bolt 12 that engages the periphery of this notched segment 11. These jaws 10 are held in a support 13 which is in turn mounted to slide longitudinally on the frame 6.

At 14 is a feed carriage on which the frame 6 is mounted. This carriage is actuated by the rack 15 and pinion 16 by mechanism hereinafter described to travel lengthwise on the bed and give the necessary longitudinal feed motion to the work when the same is being operated upon by the cutter. To obtain the longitudinal grading, or grading for length of mold, I have provided another longitudinally slidable carriage 60 (see Fig. 13) that is connected to the main carriage 14 by the connection 61 through the stroke regulating arm 62 and to the said pattern frame by the adjustable connection 66. This regulating arm is pivoted below at 63 and hinged to said carriage at 64. When it is desired to make the mold or work longer than the pattern, the connecting point 65 is raised in the slot above the pivoting point 64 and when said mold is to be shorter than the model the said connecting point is dropped below the said pivoting point, the amount of raise or drop being regulated to conform to the desired difference in length between the mold or work and the pattern. This carriage 60 is also adjustable transversely by screw 17′, and the pattern and work may be adjusted laterally on their carriage 14 by means of the screw 17 threaded into the nut 18 in said carriage.

The yoke 19 is pivotally mounted on the bearing 20 and is provided with two upwardly extending arms 38 and 39 and pivotally mounted in this yoke between said arms are both the cutter arm 21 and the tracing arm 22 one directly above the other on the short shafts 23 and 24 respectively. These two arms are connected together at their outer ends by the rod 25 so they may be actuated up and down in time with each other. The tracer arm is slotted at 26 near its outer end and adjustably held in this slot is the tracing point 27 that comes in contact with the face of the model 9, this adjustment being the means for regulating the comparative width between the pattern and the work, as when the tracer is set out beyond the vertical line of the cutter the work is formed narrower and when said pointer is set in or toward the pivoting point of its arm beyond the cutter the work is formed wider than the pattern. On the edge of this slot is a graduated plate 28 scaled to correspond to the different widths that may be desired and by aid of which the tracer may be readily positioned for any predetermined width. Rotatably mounted near the outer end of the cutter arm is the cutter 29 which is fixed on the spindle 30.

At 31 is the main driving pulley fixed on the upright main shaft 32 and this cutter 29 receives its rotary motion from said main shaft 32 through the gears 33 and 34 and through the pulley 35 that is connected to said gear 34, belt 36 and pulley 37.

In order to hold the cutter and tracer into contact with the work and pattern, respectively, I have provided a tension arm 40 extending out from the yoke arm 38 in the opposite direction from said cutter and tracer arms, and to this first mentioned arm have attached a weight 41 by the cord 42.

The cutter and tracer arms are arranged to be fed vertically either by hand or automatically at the end of each longitudinal stroke of the work carriage. The hand mechanism is operated through the hand wheel 43 (see Fig. 9) to rotate the gears 44 and 45 and upright screw 46. The rotation of this screw moves the nut 47 either up or down in its guide 48 and the movement of this nut actuates the said cutter and tracer arms through the connection 49. The automatic feed for these arms is accomplished by attaching a small spur gear 50 to the upper end of this upright screw shaft 46 and rotating the same either to the right through the gear 51, or to the left by gear 52 and intermediate gear 53. (See Figs. 7 and 8). The large gear 54, into which either of these gears may be meshed, and the ratchet gear 55 are both mounted on the pin 56 and connected together to be acted upon by the pawls 57 and 58 to actuate said ratchet at each end of the stroke of said work carriage and rotate the same always in one direction. Both the said pawls are hung in the sliding bar 59 and are arranged to act on the ratchet gear alternately first one and then the other as said bar is moved longitudinally forward and back by the carriage 60. The carriage engages and moves said bar at the end of each stroke by engagement of the lug 67 with the dogs 68 and 69. As above stated, when it is desired to reverse the direction of rotation of the screw 46, the gear 51 is thrown out of mesh with gear 54, and gear 52 is thrown into mesh by the movement of the plate 70. Said plate 70 is operated by handle 71, and said screw shaft 46 is driven in the reverse direction through said intermediate gear 53.

The work carriage may be operated to receive its longitudinal motion either automatically or by hand. To operate the same automatically any desired mechanism may be employed but in this case I preferably drive the shaft 77 through the worm 75 and worm wheel 76, said worm being fixed to the shaft 79. This shaft 79 is hung in the pivoted bearing 80 at one end and held up at its opposite end by the vertically movable bracket 81. This bracket is locked in the up position by the slide bolt 74 that engages the notch 87 therein. Loosely mounted on this shaft 79 are the two pulleys 82 and 83 that are driven each in opposite directions through the straight and cross belts 84 and 85 from the shaft 86 (see Fig. 1), which shaft is driven from the main shaft 32 through the worm 88, gear 89 and cone pulleys 90 and 91. In order that the movement of the carriage may be reversed at each end of its stroke an auxiliary reversing slide plate 93 has been provided which plate is actuated at each end of the stroke of the work carriage by engagement with the adjustable dogs 94 and 95, (see Fig. 6). On this slide plate is mounted the clutch lever actuating spring pin 92 which pin is arranged to be forced over the beveled end of the clutch lever 96 and by the tension of said pin forcing down on the beveled portion of the opposite side of said lever, withdraw the double faced friction cone 97 from pulley 82 and force the same into the oppositely driven pulley 83. In case this spring is not sufficient to accomplish the throwing of this clutch the auxiliary lever 98 is pivoted to the frame at 99 (see Fig. 5), and is engaged at its lower end by the pins 100 and 101 adjustably held in said slide plate 93 to engage the upper end of said reversing lever through the pin 102 and positively throw the friction cone into the opposite pulley, and the carriage then moves in the opposite direction until again reversed by the engagement of the dog 94 with said actuating mechanism.

When it is desired to operate the carriage by hand the worm 75 may be thrown out of engagement with the worm gear 76 by withdrawing the bolt or latch 74 from the notch 87 in the bracket 81 through the upward movement of the lever 73 and allow the shaft 79 to drop. Then the shaft 77, on which the pinion 16 is mounted, is free to be turned by the hand wheel 78 (see Fig. 5) mounted on the outer end thereof and the carriage that carries both the model and the mold may be moved longitudinally at will.

The advantages and operation of my improved die cutting machine will be readily apparent to those skilled in the art to which it appertains. It will be particularly observed that I have produced a machine by means of which a die or mold may be cut which will be an exact duplicate of the pattern, or which may vary in size in proportion to the pattern in a fixed ratio, or which may vary from the relative proportions of the pattern without any fixed ratio. In other words the relative length and width of the pattern may be reproduced; or the relative length may be reproduced with a disproportionate width; or the relative width may be reproduced with a disproportionate length. It will be further noted that I have provided means whereby the tracer and the cutter are automatically moved at the end of each stroke of the pattern and work holding carriages. It will also be observed that I have provided pattern and work holders that are adjustably mounted in their supporting frames or carriages.

Having thus described my invention, what I claim as new and desire to secure by Letters Patent, is:

1. A die cutting machine comprising a feed carriage, a work holder mounted thereon, a pattern holder mounted upon said work holder, a cutter, a tracer, means for reciprocating said feed carriage, means operated by said carriage for reciprocating said pattern holder relative to the work holder, means for varying the relative throw of the work and pattern holders, and means for feeding the cutter and tracer transversely with relation to the pattern and work holders.

2. A die cutting machine comprising a feed carriage, a work holder mounted thereon, a pattern holder mounted upon said work holder, a pair of pivoted arms, a cutter mounted in one of said arms, a tracer mounted in the other arm, means for reciprocating said feed carriage, means operated by said carriage for reciprocating said pattern holder relative to the work holder, means for varying the relative throw of the work and pattern holders, means for feeding the cutter and tracer transversely with relation to the pattern and work holders, and means for varying the relative throw of said cutter and tracer.

3. A die cutting machine comprising a feed carriage, a work holder mounted thereon, a pattern holder mounted on said work holder, a cutter, a tracer, means for reciprocating said feed carriage, means operated by said carriage for reciprocating said pattern holder relative to the work holder, means for varying the relative throw of the work and pattern holders, means for feeding the cutter and tracer transversely with relation to the pattern and work holders, and means for varying the relative throw of the cutter and the tracer.

4. A die cutting machine comprising a single carriage, means for reciprocating the same, a work holder mounted to move with said carriage, a pattern holder resting on said work holder and free to reciprocate thereon, means operated by said carriage to reciprocate said pattern holder independently of said work holder, and means for varying the relative throw of said holders.

5. A machine of the character described comprising a swiveled yoke, parallel arms pivoted between the members of said yoke, means for automatically moving said arms in unison, a cutter mounted in one of said arms, a tracer mounted in the other arm, means for adjusting said tracer longitudinally with relation to said pattern holder, and means for holding said arms normally to the work.

6. A machine of the character described comprising a yoke, parallel arms pivoted between the members of said yoke, said arms being connected at their free ends, a cutter mounted in one of said arms, a tracer mounted in the other arm, means for adjusting said tracer longitudinally with relation to said pattern holder, means for automatically moving said tracer and cutter in unison, and connections between said arms, whereby they are moved in unison.

7. A machine of the character described comprising a yoke, parallel arms pivoted between the members of said yoke, one of said arms being provided with a slot, means for automatically moving said arms in unison, a tracer adjustably mounted in said slot, and a cutter carried by the other arm.

8. A machine of the character described comprising a yoke provided with parallel pivoted arms, a cutter mounted in one of said arms, a tracer mounted in the other arm, a feed screw, connections between said screw and one of said arms, automatic means for intermittently operating said screw, and a rod connecting the free ends of said arms.

9. A machine of the character described comprising a yoke provided with parallel pivoted arms, a cutter mounted in one of said arms, a tracer mounted in the other arm, means for adjusting said tracer laterally with relation to said cutter, a feed screw, connections between said screw and one of said arms, automatic means for intermittently operating said screw, and a rod connecting the free ends of said arms.

10. A machine of the character described comprising a yoke provided with parallel pivoted arms connected at their free ends, a cutter mounted in one of said arms, a tracer mounted in the other arm, a feed screw, connections between said screw and one of said arms, a reciprocating carriage, and means for rotating said feed screw at the end of each stroke of said carriage.

11. A machine of the character described comprising a yoke provided with parallel pivoted arms connected at their free ends, a cutter mounted in one of said arms, a tracer mounted in the other arm, a feed screw, a ratchet keyed to said feed screw, a reversing bar provided with oppositely arranged pawls engaging said ratchet, and means for automatically operating said reversing bar.

12. A machine of the character described comprising a yoke provided with parallel pivoted arms connected at their free ends, a cutter mounted in one of said arms, a tracer mounted in the other arm, a feed screw, connections between said feed screw and one of said arms, a reciprocating carriage, means for automatically rotating said feed screw at the end of each stroke of said carriage, and means for reversing the movement of said carriage.

13. A die cutting machine comprising a single carriage, a work holder and a pattern holder supported on said carriage, means for securing said work holder to prevent relative movement with said carriage, said pattern holder being free to reciprocate, means for automatically reciprocating said carriage, means connected to the carriage to reciprocate said pattern holder, and means for varying the relative throw of said holders.

14. A machine of the character described comprising a feed carriage, a work holder, a slidable carriage operated by said feed carriage, a pattern holder reciprocated by said slidable carriage, and means for varying the movement of said holders relatively to each other.

15. A machine of the character described comprising a feed carriage, a work holder, a slidable carriage operated by said feed carriage, a pattern holder reciprocated by said slidable carriage, and means interposed between the two carriages for regulating the throw of said holders.

16. A machine of the character described comprising a feed carriage, a work holder mounted thereon, a pattern holder mounted on said work holder, means for reciprocating said carriage, means connected to said carriage for reciprocating said holders in unison, and means for varying the relative throw of said holders.

17. A machine of the character described comprising a feed carriage, a work holder mounted thereon, means for reciprocating said feed carriage, a slidable carriage, a stroke regulating arm connecting said carriages, and a pattern holder operated by said slidable carriage.

18. A machine of the character described comprising a feed carriage, a work holder mounted thereon, means for reciprocating said feed carriage, a slidable carriage, a slotted regulating arm connected to said slidable carriage, a pitman having one end connected to said work holder and the other end adjustably secured in the slot of said regulating arm, and a pattern holder operated by said slidable carriage.

19. A machine of the character described comprising a feed carriage, a work holder mounted thereon, means for reciprocating said feed carriage, a slidable carriage, a pitman connected at one end to said work holder, means for adjustably connecting the other end of said pitman to said slidable carriage, and a pattern holder operated by said slidable carriage.

20. A machine of the character described comprising a feed carriage, a work holder mounted thereon, means for reciprocating said feed carriage, a slidable carriage, a pattern holder, connections between said pattern and work holders and said slidable carriage, and means for varying the positions of said carriage and work holder relative to each other.

21. A machine of the character described comprising reciprocating carriers mounted one upon the other, a work holder and a pattern holder having their ends respectively mounted to swing in said carriers, and means for securing an axial adjustment of said holders.

22. A machine of the character described comprising reciprocating carriers mounted one upon the other, a work holder and a pattern holder having their ends respectively mounted to swing in said carriers, means for effecting an axial adjustment of said holders, means for reciprocating said carriers in unison, and means for varying the relative throw of said carriers.

23. A machine of the character described comprising a tracer, a cutter, a yoke provided with parallel supporting arms for said cutter and tracer respectively, connections between said arms, a reciprocating carriage, a pattern holder and a work holder supported by said carriage, a feed screw connected to one of said arms, and means operated by said carriage for intermittently rotating said feed screw.

24. A machine of the character described comprising a tracer, a cutter, a yoke provided with parallel supporting arms for said cutter and tracer respectively, connections between said arms, a reciprocating carriage, a pattern holder and a work holder supported by said carriage, a feed screw connected to one of said arms, means for reversing said carriage, and means operated by said carriage for imparting movement to said feed screw at the end of each stroke of said carriage.

25. A machine of the character described comprising a tracer, a cutter, a yoke provided with parallel supporting arms for said cutter and tracer respectively, connections between said arms, a reciprocating carriage, a pattern holder and a work holder supported by said carriage, a feed screw connected to one of said arms, means for reversing said carriage, a ratchet on said feed screw, and a reverse bar operated by said carriage and provided with oppositely arranged pawls alternately engaging said ratchet.

26. A machine of the character described comprising a carriage, a work holder mounted thereon, a pattern holder mounted on said work holder, means for adjusting said pattern holder transversely on said carriage, a cutter and a tracer respectively mounted adjacent said holders, means for reciprocating said carriage, said means including a shaft, a clutch for controlling the direction of rotation of said shaft, and means operated by said carriage for automatically throwing said clutch.

27. A machine of the character described comprising a work holder, a pattern holder, a carriage, a stroke-regulating arm pivoted at one end and interposed between said carriage and said work holder, the free end of said arm being pivotally connected to said carriage, means for adjustably connecting said work-holder with the free end of said regulating arm, and connections between said carriage and said pattern holder.

28. A machine of the character described comprising a work holder, a pattern holder, a carriage, a stroke regulating arm pivoted at its lower end, the upper end of said arm being slotted and interposed between said work holder and said carriage, said carriage being pivotally connected to said arm adjacent the slotted portion of the latter, and a pitman having one end pivoted to said work holder, the other end thereof being adjustably mounted in the slot of said regulating arm.

29. A machine of the character described comprising carriers mounted one upon the other, a work holder and a pattern holder, respectively mounted in said carriers, means for effecting an axial adjustment of said holders, means for adjusting said carriers relatively to each other, and means for moving said carriers in unison.

30. A machine of the character described comprising carriers mounted one upon the other, means for adjusting said carriers relatively to each other, a work holder and a pattern holder each provided with trunnions mounted in said carriers, a notched segment carried by each of said holders, a spring locking pin for engaging each segment, and means for reciprocating said carriers.

In testimony whereof I affix my signature in presence of two witnesses.

HENRY J. DOUGHTY.

Witnesses:
HOWARD E. BARLOW,
E. I. OGDEN.